United States Patent
Kelly et al.

(10) Patent No.: US 9,615,038 B2
(45) Date of Patent: *Apr. 4, 2017

(54) METHODS AND APPARATUS FOR TRUE HIGH DYNAMIC RANGE IMAGING

(71) Applicant: Massachusetts Institute of Technology, Cambridge, MA (US)

(72) Inventors: Michael W. Kelly, North Reading, MA (US); Megan H. Blackwell, Boston, MA (US); Curtis B. Colonero, Shrewsbury, MA (US); James Wey, Arlington, MA (US); Christopher David, Chelmsford, MA (US); Justin Baker, North Andover, MA (US); Joseph Costa, Bedford, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/995,557

(22) Filed: Jan. 14, 2016

(65) Prior Publication Data

US 2016/0134821 A1 May 12, 2016

Related U.S. Application Data

(63) Continuation of application No. 14/261,840, filed on Apr. 25, 2014, now Pat. No. 9,270,895.
(Continued)

(51) Int. Cl.
H04N 5/355 (2011.01)
H04N 5/3745 (2011.01)
(Continued)

(52) U.S. Cl.
CPC ....... *H04N 5/35581* (2013.01); *H04N 5/2355* (2013.01); *H04N 5/23254* (2013.01);
(Continued)

(58) Field of Classification Search
CPC .......... H04N 5/35581; H04N 5/37455; H04N 5/2355; H04N 5/23254; H04N 5/23267; H04N 5/355; H04N 5/35572
See application file for complete search history.

(56) References Cited

U.S. PATENT DOCUMENTS 6,021,172 A 2/2000 Fossum et al.
6,678,039 B2 1/2004 Charbon
(Continued)

OTHER PUBLICATIONS

Kavusi, S. et al., "Quantitative Study of High Dynamic Range Image Sensor Architectures", SPIE-IS&T, vol. 5301, pp. 264-275, 2004.
(Continued)

*Primary Examiner* — Luong T Nguyen
(74) *Attorney, Agent, or Firm* — Cooley LLP

(57) ABSTRACT

When imaging bright objects, a conventional detector array can saturate, making it difficult to produce an image with a dynamic range that equals the scene's dynamic range. Conversely, a digital focal plane array (DFPA) with one or more m-bit counters can produce an image whose dynamic range is greater than the native dynamic range. In one example, the DFPA acquires a first image over a relatively brief integration period at a relatively low gain setting. The DFPA then acquires a second image over longer integration period and/or a higher gain setting. During this second integration period, counters may roll over, possibly several times, to capture a residue modulus $2^m$ of the number of counts (as opposed to the actual number of counts). A processor in or coupled to the DFPA generates a high-dynamic range image based on the first image and the residues modulus $2^m$.

20 Claims, 16 Drawing Sheets

Related U.S. Application Data

(60) Provisional application No. 61/860,438, filed on Jul. 31, 2013.

(51) Int. Cl.
  *H04N 5/235* (2006.01)
  *H04N 5/232* (2006.01)

(52) U.S. Cl.
  CPC ......... *H04N 5/23267* (2013.01); *H04N 5/355* (2013.01); *H04N 5/35572* (2013.01); *H04N 5/37455* (2013.01)

(56) References Cited

U.S. PATENT DOCUMENTS

| | | | |
|---|---|---|---|
| 6,900,746 B1 * | 5/2005 | Lovell | H03M 9/00 |
| | | | 341/100 |
| 7,142,723 B2 | 11/2006 | Kang et al. | |
| 8,081,224 B2 | 12/2011 | Lin | |
| 8,179,296 B2 | 5/2012 | Kelly et al. | |
| 8,399,848 B2 | 3/2013 | Frach et al. | |
| 8,426,797 B2 | 4/2013 | Aull et al. | |
| 8,605,853 B2 | 12/2013 | Schultz et al. | |
| 8,692,176 B2 | 4/2014 | Kelly et al. | |
| 8,836,807 B2 * | 9/2014 | Qin | H04N 5/35581 |
| | | | 348/222.1 |
| 9,270,895 B2 * | 2/2016 | Kelly | H04N 5/2355 |
| 2007/0075888 A1 | 4/2007 | Kelly et al. | |
| 2010/0226495 A1 | 9/2010 | Kelly et al. | |
| 2011/0141310 A1 * | 6/2011 | Alacoque | H04N 19/63 |
| | | | 348/222.1 |
| 2011/0235771 A1 * | 9/2011 | Aull | H04N 5/355 |
| | | | 377/19 |
| 2012/0081589 A1 | 4/2012 | Nishihara | |
| 2012/0138774 A1 | 6/2012 | Kelly et al. | |
| 2012/0262322 A1 | 10/2012 | Kelly et al. | |
| 2013/0003911 A1 | 1/2013 | Schultz et al. | |

OTHER PUBLICATIONS

Yadid-Pecht, O. et al., "Wide Intrascene Dynamic Range CMOS APS Using Dual Sampling", IEEE Transactions on Electron Devices, vol. 44, No. 10, Oct. 1997, pp. 1721-1723.

Yang, X. D. et al., "A 640×512 CMOS Image Sensor with Ultrawide Dynamic Range Floating-Point Pixel-Level ADC", IEEE Journal of Solid-State Circuits, vol. 34, No. 12, Dec. 1999, pp. 1821-1833.

Notification of Transmittal of the International Search Report and the Written Opinion of the International Searching Authority in related PCT Application No. PCT/US2014/035502 mailed Sep. 22, 2014, 9 pages.

* cited by examiner

Short-integration-
Time Image $T_{int} = 100\ \mu s$

Long-integration-
Time Image $T_{int} = 10\ ms$

Laser

Number of Rollovers

True High
Dynamic Range
Processed Image

Laser

METHODS AND APPARATUS FOR TRUE HIGH DYNAMIC RANGE IMAGING

CROSS-REFERENCE TO RELATED PATENT APPLICATION

This application is a continuation of U.S. application Ser. No. 14/261,840, now U.S. Pat. No. 9,270,895, filed Apr. 25, 2014, which in turn claims priority, under 35 U.S.C. §119(e), from U.S. Provisional Application 61/860,438, filed Jul. 31, 2013, and entitled "True High Dynamic Range Imaging." Each of these applications is hereby incorporated herein by reference in its entirety.

GOVERNMENT SUPPORT

This invention was made with government support under Contract No. FA8721-05-C-0002 awarded by the U.S. Air Force. The government has certain rights in the invention.

BACKGROUND

Analog focal plane arrays (FPAs) have a fixed well depth determined by the maximum capacitor size that can fit within each pixel. The capacitor integrates as much charge as is allowable and then the signal from each row or column of adjacent pixels is digitized in an ADC. This leads to image saturation and does not allow quality images of scenes having a wide dynamic range (e.g., dim objects and bright objects). In the analog approach, the true signal generally cannot be recovered after the image saturates.

One approach to generating high dynamic range (HDR) images is to acquire data at different exposures, integration times, or gains, and then stitch these images together depending on the signal present in the scene. Other techniques employ a logarithmic response function at the pixel level. Using these techniques, high dynamic range scenes can be sufficiently displayed for human visual consumption. However, there are shortfalls associated with conventional HDR techniques, including: (1) image acquisition periods that are long enough to be susceptible to scene motion; (2) information loss due to gaps in the transfer function (of counts to photons), low signal-to-noise ratio (SNR), or both; and (3) complicated processing to piece together the HDR image from many images with low dynamic range. Achieving full rate video HDR can also be challenging.

SUMMARY

Embodiments of the present invention include systems and methods for generating a digital representation of a scene. In example, the system includes at least one detector element, at least one m-bit counter operably coupled to the detector element, and a processor operably coupled to the m-bit counter. In operation, the detector element detects incident photons during a first integration period at a first gain, and the m-bit counter generates a first count that is less than or equal to m and represents photons detected by the detector element during the first integration period at the first gain. During a second integration period, which may be longer than the first integration period, the detector element detects photons at a second gain, which may be greater than the first gain. The m-bit counter generates a residue modulo $2^m$ of a second count that is greater than $2^m$ and represents the photons detected the detector element during the second integration period. The processor generates the digital representation of the scene based at least in part on the first count and the residue modulo m of the second count.

In some examples, the processor generates this digital representation in real time and/or with a high dynamic range (i.e., a dynamic range greater than that achievable using the m-bit counter alone). For instance, the processor may generate the digital representation of the scene with an effective bit depth of greater than m bits. In certain cases, the processor generates the digital representation of the scene by: (i) estimating a photon flux incident on the detector element during the first integration period based at least in part on the first count; and (ii) estimating the second count based at least in part on the photon flux estimated in (i), the second integration period, and the residue modulo m of the second count. The processor may also generate the digital representation of the scene by concatenating k bits of the first count with l bits of the second count, wherein k≤m, l≤m, and l+k≥m+2. The processor may also estimate a noise level associated with the digital representation of the scene based on a comparison of a most significant bit (MSB) of the first count to a corresponding bit in the second count.

In some cases, the detector element may detect photons during a third integration period that is shorter than the second integration period, the m-bit counter may generate a third count that is less than or equal to $2^m-1$ and represents the photons detected by the detector element during the third integration period, and the processor may identify and/or compensate for motion in the scene based on a comparison of the first count to the third count. Alternatively, or in addition, the processor may generate the digital representation of the scene based at least in part on the third count. For instance, the processor may estimate a first photon flux incident on the detector element during the first integration period based at least in part on the first count and a third photon flux incident on the detector element during the third integration period based at least in part on the third count, then generate the digital representation based at least in part on the first photon flux and the third photon flux.

In another embodiment, the system may include a plurality of detector elements, each of which is operably coupled to a corresponding m-bit counter in a plurality of m-bit counters, which in turn is coupled to a processor. In operation, a first m-bit counter in the plurality of m-bit counters generates a first count that is less than or equal to $2^m-1$ and represents photons detected by a corresponding first detector element in the plurality of detectors elements during a first integration period. The first m-bit counter also generates a residue modulo $2^m$ of a second count that is greater than m and represents photons detected by the corresponding first detector element during a second integration period, which is longer than the first integration period. And the first m-bit counter generates a third count that is less than or equal to m and represents photons detected by the corresponding first detector element during a third integration period, which is also shorter than the second integration period. The processor performs a comparison of the first count to the third count to determine if motion was present in the scene during the second integration period. Responsive to the comparison, the processor generates the digital representation of the scene based at least in part on the first count, the residue modulo $2^m$ of the second count, the third count, and/or the comparison of the first count to the third count.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 11B is a THDR image of the lightbulb shown in FIG. 11A acquired while the lightbulb is on.

DETAILED DESCRIPTION

Figure 1:
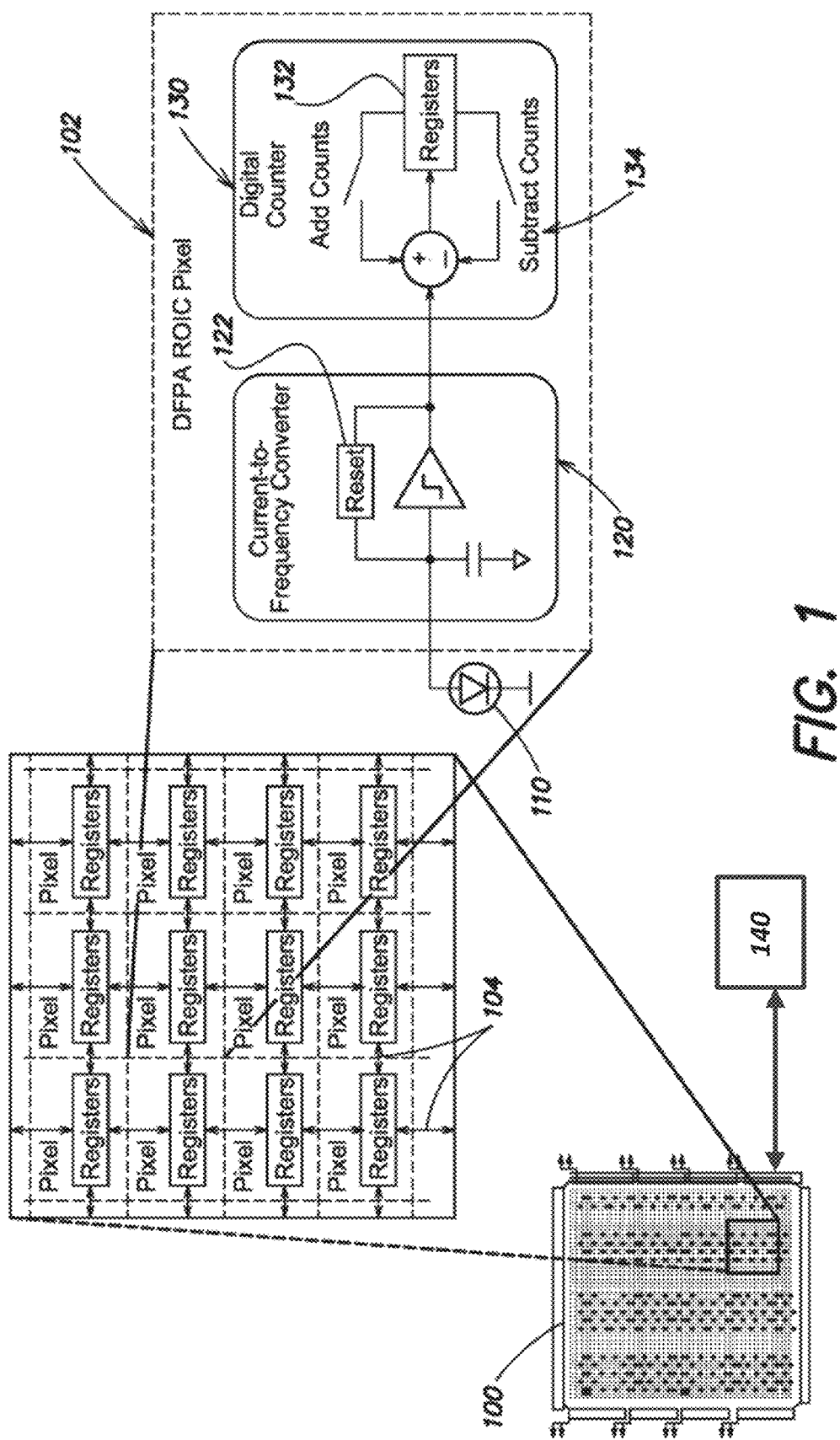
FIG. 1 is a block diagram of an exemplary digital focal plane array (DFPA) configured to generate true high dynamic range images.

Embodiments of the present invention include a digital-pixel focal plane array (DFPA) that extends the achievable dynamic range by placing an analog-to-digital converter (ADC) in every pixel. This architecture can expand the native well depth, or maximum number of integrated electrons and thus dynamic range, by a factor of about 30 beyond the well depth of analog focal plane arrays (FPAs). However, the dynamic range still hits a ceiling when the counter or "digital well" in each DFPA pixel becomes full. At this point, the counter can either stop counting or rollover. If the counter stops counting, then its maximum count value determines the upper bound to the dynamic range. And if the counter rolls over, then information may be lost.

In an inventive DFPA, however, the counter rollover can be used to extend the dynamic range. To see how, consider a stopwatch with a minute hand and a second hand (or, equivalently, a minutes counter and a seconds counter). By itself, the stopwatch's second hand measures up to 60 seconds; after 60 seconds, the second hand "rolls over," resulting in information loss. For example, consider measuring two different quantities with the stopwatch: (1) 57 seconds and (2) 313 seconds. The second hand can measure the first quantity, 57 seconds, without information loss because the first quantity is less than 60 seconds. But measuring the second quantity, 313 seconds, with the second hand alone produces a measurement of 13 seconds, which is the residue modulus 60 of 313 seconds. (In mathematics, the "residue modulo m" is defined as b in the congruence a≡b (mod m). In this example, a represents the measurement of 13 seconds and m represents the 60 seconds measured by the second hand.) By keeping track of the number of times that the second hand "rolls over" with the minute hand, however, it is possible to measure amounts of time greater than 60 seconds.

Likewise, the value contained within an m-bit counter that rolls over upon reaching $2^m$ is the residue modulo $2^m$ of the events counted by the m-bit counter. In other words, the counter measurement is the fractional remainder resulting from the product of $N_{triggers}$ (the total number of count triggers in the integration time) divided by the total number of states of the counter (e.g., $2^m$, where m is the bit depth, or number of bits, in the counter). For example, a 16-bit ADC has $2^{16}-1(=65,535)$ counter states. When the result of the division results in a value more than 1, the counters are said to have "rolled over." In this manner, the DFPA counter is a modulo $2^m$ system that can be used with another, more granular counter to provide a count whose dynamic range is greater than a dynamic range that would be achievable with an m-bit counter alone. Like the clock described immediately above, the DFPA counter provides a remainder modulo m of a number representative of the electrons that have been counted since the integration period began. In other words, "unwrapping" the rollovers yields an estimate of the true signal having a dynamic range greater than the intrinsic dynamic range of the counter.

True high dynamic range (THDR) imaging provides a way of recovering potentially lost information due to rollovers by extending the dynamic range of the sensor. To accomplish THDR, two or more images are collected and processed. At least one image has a short integration period ($T_S$), resulting in a narrow dynamic range image ($I_S$). The integration period is chosen so that zero rollovers are expected. At least one other image has a long integration period ($T_L$), resulting in an image ($I_L$) with ambiguous transfer function characteristics. Since there are no ambiguities within $I_S$, it can be used to predict the number of rollovers in $I_L$. The true transfer function of $I_L$ can then be calculated to produce a THDR image.

Digital Focal Plane Arrays (DFPAs) for True High Dynamic Range Imaging

FIG. 1 shows a block diagram of an exemplary DFPA 100 that is configured to generate true high dynamic range images. The DFPA 100 includes an array of pixels 102, which are connected to each other via control/transfer lines 104. These control/transfer lines 104 can be used to transfer data among the pixels 102 in the array, e.g., for filtering, motion compensation, or computation. Each pixel 102 includes a respective detector element 110, a respective analog-to-digital converter (ADC) 120, and a respective m-bit counter 130. The ADC 120 contains reset circuitry 122, and the counter 130 includes up/down switching circuitry 134 coupled between the output of the ADC 120 and the input(s) of an m-bit register 132 that stores count values. In this case, the up/down switching 134 allows the counter 130 to act as an up/down counter; in other cases, the counter 130 may be a ripple counter, ring counter, modulus counter, cascaded counter, or any other suitable counter. The DFPA 100 is operably coupled to another processor 140, which may be bump-bonded to the DFPA 100 chip, fabricated on the same chip as the DFPA 100, or external to the DFPA 100. This other processor may control the reset circuitry 122 in the ADC 120, the up/down switching circuitry 134 in the counter 130, and/or data transfer among pixels on the control/transfer lines 104.

In operation, each detector element 110 converts incident photons into pulses of photocurrent with a given quantum efficiency. In some cases, the DFPA 100 provides variable amplification for the pulses of photocurrent emitted by the detector elements 110. Each detector element 110 couples its output to a corresponding ADC 120, shown in FIG. 1 as a current-to-frequency converter, which converts the pulses of photocurrent into a digital signal counted by the corresponding m-bit counter 130. The m-bit counter 130 accumulates and stores a count that represents the number of pulses of photocurrent generated by the ADC 120 during a particular integration period. When the count exceeds the counter's maximum capacity (i.e., if the count reaches m), then the counter 130 will rollover and begin counting again at 0.

Typically, the counter 130 rolls over because the number of pulses per detector integration period is greater than m, leaving a count value equal to the residue modulo $2^m$ of the count. Counter rollover can be promoted, if not guaranteed, by selecting a sufficiently long detector integration period, by amplifying the photocurrent produced by the detector elements 110, or both. In some cases, the length of the detector integration period and/or the photocurrent gain can be selected by or via the processor as described below.

For additional information on DFPAs, see, e.g., U.S. Pat. Nos. 8,179,269, 8,605,853, or U.S. Pat. No. 8,692,176, each of which is incorporated herein by reference in its entirety.

Figure 2:
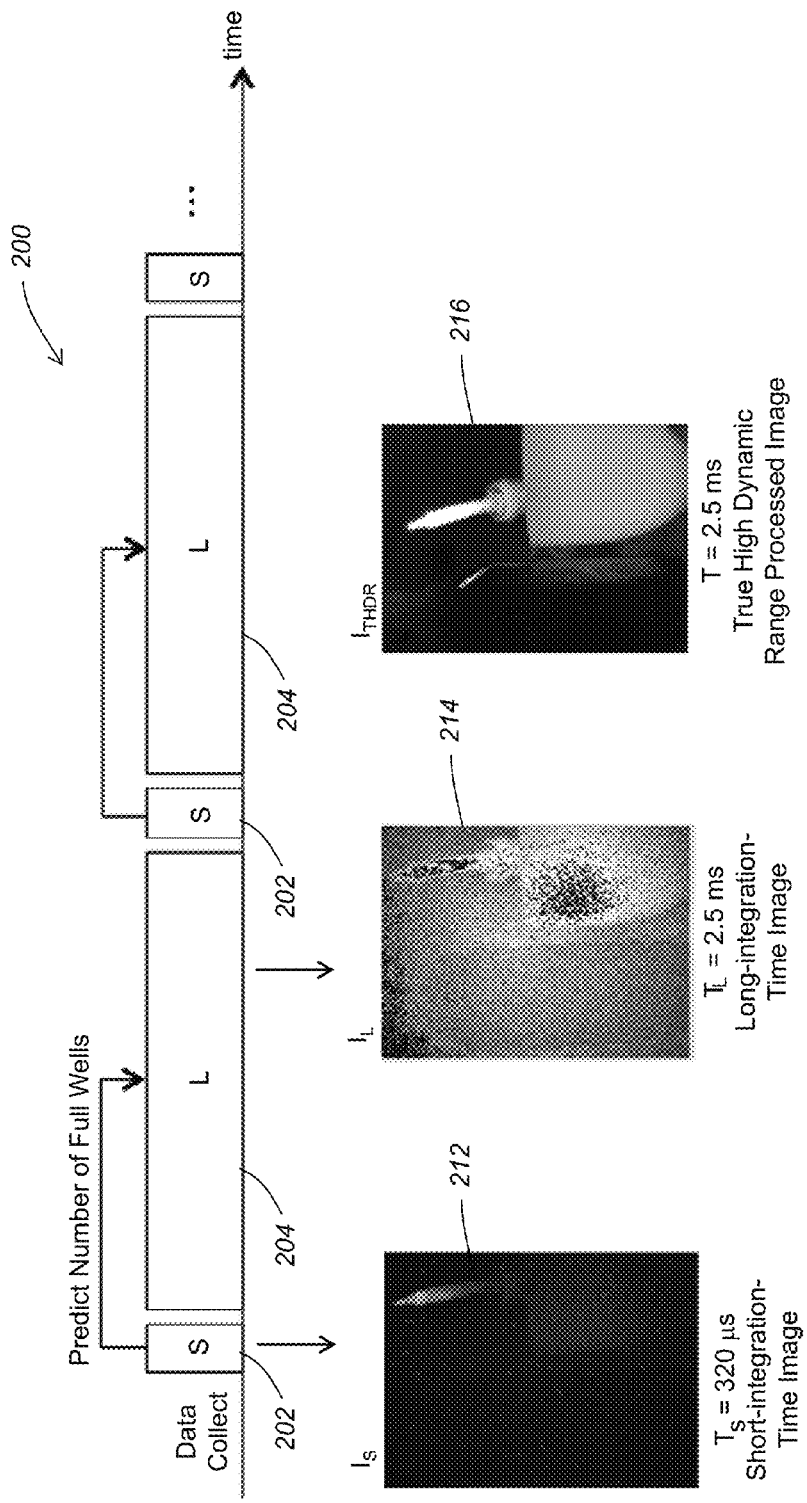
FIG. 2 is a diagram that illustrates a process of generating a true high dynamic range processed image.

FIG. 2 illustrates true high dynamic range imaging by acquiring a series of images over a series 200 of alternating short integration periods 202 and long integration periods 204 with the DFPA 100 shown in FIG. 1 or other suitable imaging array. In the case shown in FIG. 2, the short integration period is approximately 320 µs, the long integration period is approximately 2.5 ms, Other short and long integration periods also possible. Generally speaking, the short integration period's duration is chosen so that none of the counters are expected to roll over, and the long integration period's duration is chosen so that at least one counter rolls over. In some cases, the long integration period may be selected based on the photon flux or count rate during a corresponding short integration period.

The long and short integration periods may also be selected to support video rate imaging. At video rates of 60 Hz or greater, the processing is effectively real time, and the lag between successive sets of short and long integration periods should be 16 ms or less. The maximum frame rate is given by $1/(T_S+T_L+2T_r)$, where $T_r$ is the time required to read out a frame from the DFPA, estimated to be about 150 microseconds for a 640 pixel×480 pixel DFPA. This frame rate is considerably higher than other approaches for high dynamic range imaging and is fast enough to support video frame rates of 60 Hz or more.

During each short integration period 202, the DFPA 100 acquires a low-intensity image 212. And during each long integration period 204, the DFPA 100 acquires a high-intensity image 214. Neither the DFPA 100 nor the processor 140 records the number of counter rollovers that have occurred during a particular integration period when only a single image is recorded of a scene, resulting in potential information loss. If the dynamic range of the scene exceeds the dynamic range of the counters ($2^m$ counts), then the resulting image may include one or more pixels corresponding to counters that have rolled over at least one or more times than neighboring pixels, as indicated by dark spots in the middle of the high-signal regions in the lower right quadrant of image 214.

To account for this information loss, the processor 140 estimates the number of counter rollovers based on the count(s) recorded during one or more short integration periods 202 and the ratio of the lengths of the short integration period 202 and the long integration period 204. Specifically, a linear count rate ($C_R$) is assumed for each pixel for a given scene and is estimated based on the signal ($I_S$) acquired over the short integration time ($T_S$):

$$C_R(T_S)=I_S/T_S$$

Next, this count rate is used to predict the number of counts for the same scene at the long integration time ($T_L$) by multiplying the estimated pixel count rate by the long integration time.

$$\text{Predicted counts } (T_L)=C_R*T_L=I_S*T_L/T_S$$

The processor 140 divides the predicted number of counts at the long integration time by the native digital well depth, or equivalently, the maximum number of counts for a pixel before rolling over (e.g., for a 14-bit counter, the maximum count per pixel is $2^{14}-1=16383$) and rounded down (e.g., using a floor operation). This value represents the estimated number of full digital wells (FW) at the long integration time ($T_L$):

$$FW(T_L)=\text{floor}(CR*T_L/2^m)$$

The processor 140 multiplies the number of full digital wells by the native digital well depth to produce the most significant bits (MSBs) of the true signal estimate. The processor 140 adds the number of counts collected at the long integration time to the most significant bits of the estimate of the true signal:

$$\text{Estimated True Signal }(T_L)=\text{floor}(CR*T_L/2^m)*2^m+I_L$$

There are numerous variations on specific implementation. The true signal can be estimated by implementing the multiplication, division, and addition described above in real-time (e.g., using the processor 140) and/or in post processing, such as on a field-programmable gate array (FPGA) or other suitable processing device.

FIG. 2 shows a true high dynamic range image 216 generated from a first image 212 acquired during a short integration period 202 and a second image 214 acquired during a long integration period 204. In this case, the short integration period 202 had a duration $T_S$=320 microseconds and the long integration period 204 had a duration $T_L$=2.5 milliseconds, and images were acquired with a 640×480 long-wave infrared DFPA. The scene includes a soldering iron at an estimated temperature of about 340° C., a cup at an estimated temperature of about 90° C., and a bottle at an estimated temperature of about 15° C. No rollovers can be seen in the short integration time image 212. Rollovers appearing as dark regions can be seen in the long integration time image 214. No rollovers appear in the THDR image 216.

Figure 3A:
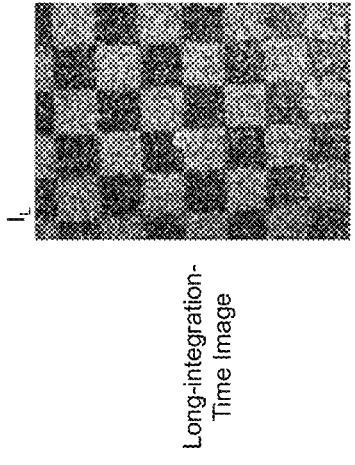
FIG. 3A shows a snapshot image, acquired during a 100 μs integration period, of a laser beam reflected off a checkerboard pattern.
Figure 3B:
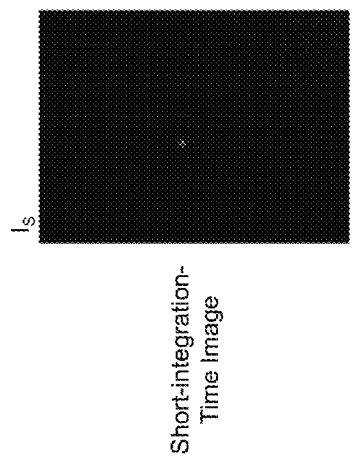
FIG. 3B shows a rollover image, acquired during a 10 ms integration period, of the laser beam and checkerboard pattern of FIG. 3A.
Figure 3D:
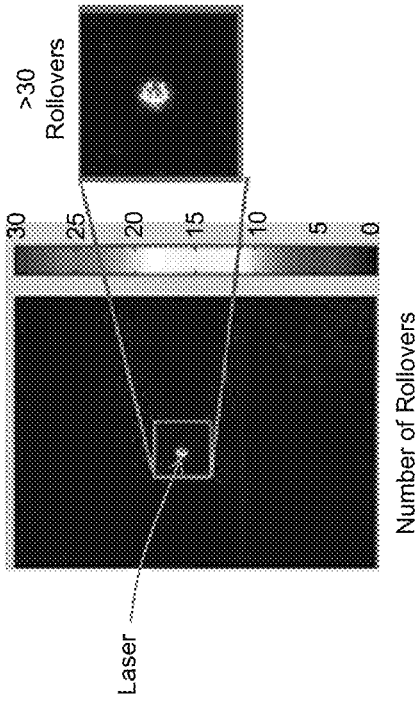
FIG. 3D shows an estimate of the number of rollovers, based on the snapshot image of FIG. 3A, in the rollover image in the rollover image of FIG. 3B.
Figure 3C:
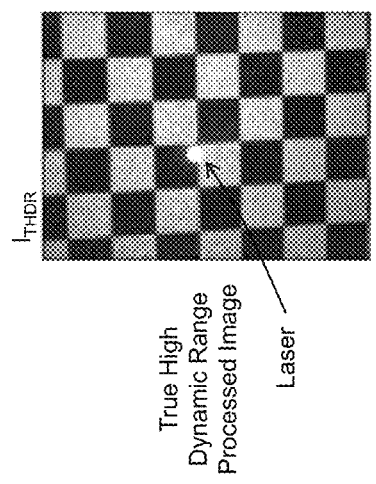
FIG. 3C shows a true high dynamic range image based on the snapshot image of FIG. 3A and the rollover image of FIG. 3B.

FIGS. 3A-3D illustrate images of a laser beam reflected off a checkerboard generated with an InGaAs DFPA using true high dynamic range imaging. FIG. 3A shows a snapshot image of the scene acquired over a short integration period of about 100 μs; the laser beam appears dim and the checkboard is not visible. FIG. 3B shows an image of the same scene acquired in a 10 ms integration period; the laser beam still appears dim (due to counter rollover), but the checkboard is more apparent. Using measurements from the snapshot image in FIG. 3A, a processor estimates the number of rollovers, shown in FIG. 3D, associated with each counter in the DFPA. The processor combines the estimated number of rollovers and the longer-integration data collection (shown in FIG. 3B) to generate a THDR image, shown in FIG. 3C. The THDR image shows a bright spot from the laser beam and a high-contrast checkerboard pattern.

In other examples, the first and second integration periods may be the same length, and the photodetector gain may be set to a first gain level during the first integration period and a second, higher gain level during the second integration period. The first gain level may be selected such that the m-bit counters 122 in the ADC array 120 are unlikely to roll over during the first integration period given the estimated or measured photon flux. And the second gain level may be selected such that one or more of the m-bit counters 122 is likely to roll over during second integration period given the photon flux. As above, the processor 140 can use the count acquired during first integration period and the modulus acquired during the second integration period and the ratio of the first and second gain levels to generate a true high dynamic range image (e.g., by substituting gain setting values $G_1$ and $G_2$ for the short and long integration periods $T_S$ and $T_L$, respectively, in the equations given above and below).

Bit Shifting for THDR Imaging

In some implementations, the multiplication and/or division described above can be implemented as bit shifts on an FPGA. Bit shifts are computationally efficient operations and can be performed relatively quickly. Because the DFPA uses binary counters, it is possible to greatly simplify the calculation of the THDR image from $I_S$ and $I_L$ when $T_S$ and $T_L$ are related by a power of 2. The short integration time may be chosen first such that there are no rollovers and the long integration time may be equal to the short integration time scaled by $2^n$, where n is a positive integer less than m, the number of bits. Alternatively, the long integration time may be chosen first such that the short integration time may be equal to the long integration time scaled by $2^{-n}$. In either case, the calculations for producing a THDR image can be accomplished entirely though bit shifting and binary addition, although bit shifting may truncate values for which the shift(s) exceeds the register length of the counter.

Figure 4:
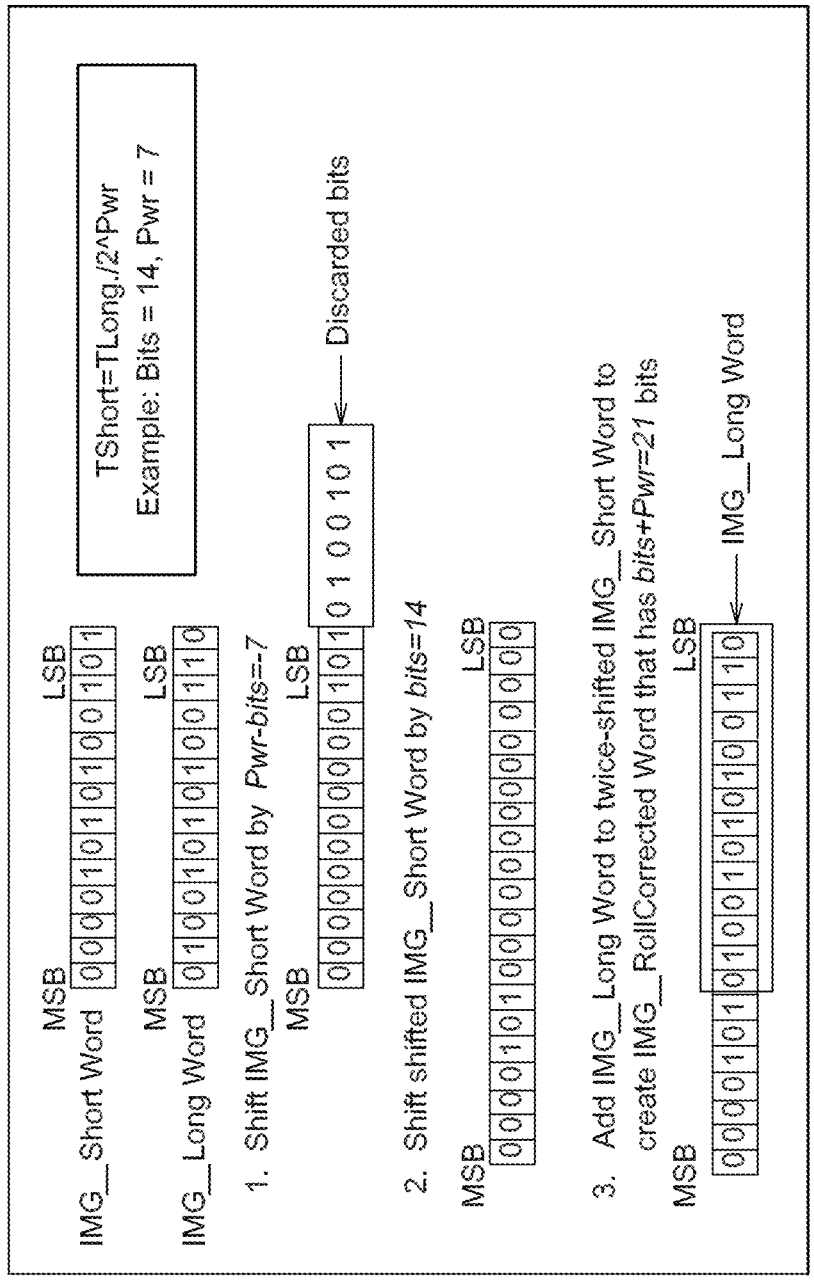
FIG. 4 illustrates one embodiment of a "truncate and append" process for true high dynamic range (THDR) imaging using bit shift operations.

In a general bit-shift operation for generating a THDR image from an image acquired during a short integration period and an image acquired during a long integration period, the short integration time is chosen to be equal to the long integration time divided by a power of 2: $T_S=T_L/2^n$, and n is chosen to equal an integer between 1 and m−1, in which m is the number of bits in the counter (e.g., m=14 and n=7 as shown in FIG. 4). In some implementations, the THDR image is computed as:

$$I_{THDR}=\text{bitshift}(\text{bitshift}(I_S, n-m), m)+I_L,$$

where bitshift(A, B) is equivalent to floor($A*2^B$) for negative values of B, and the floor operation rounds the value down to the nearest integer.

FIG. 4 illustrates one embodiment of a "truncate and append" process for THDR imaging using bit shift operations. In this case, the DFPA acquires two images: a first image $I_S$, sometimes called a snapshot image, acquired over an integration time $T_S$ and a second image $I_L$ acquired over an integration time $T_L$, with $T_L=T_S \times 2^n$. Each pixel in these images includes respective values from the counters in the DFPA; FIG. 4 shows a first count generated in a counter/register during a short integration period as "IMG_Short Word" and a modulus of a second count generated in the same counter/register during a long integration period as "IMG_Long Word." In this example, there are 14 bits in the counter/register and the long and short integration times are related by $2^7$, so m=14 and n=7. An FPGA or other processor operably coupled to the counter(s) truncates (discards) the m−n=7 least significant bits (LSBs) from IMG_Short Word to reduce the first count's word size from 14 to 7. In other words, truncating $I_S$ takes the n most significant bits of $I_S$. The FPGA then appends the remaining MSBs from the truncated first count ("IMG_Short Word" representing $I_S$) to the second count ("IMG_Long Word" representing $I_L$) for a given pixel. The bits from IMG_Short Word are appended ahead of the most significant bit of the residue of the second count (i.e., in the more significant positions). The resulting composite count (representing the THDR image) has a word size of m+n=21, where the n=7 most significant bits are from the first count and the m=14 least significant bits are from the residue of the second count. In other words, the residue of the second count is appended to the 7 most significant bits from the first count to form a composite count with a bit depth of 21 bits for the example THDR image.

Figure 5:
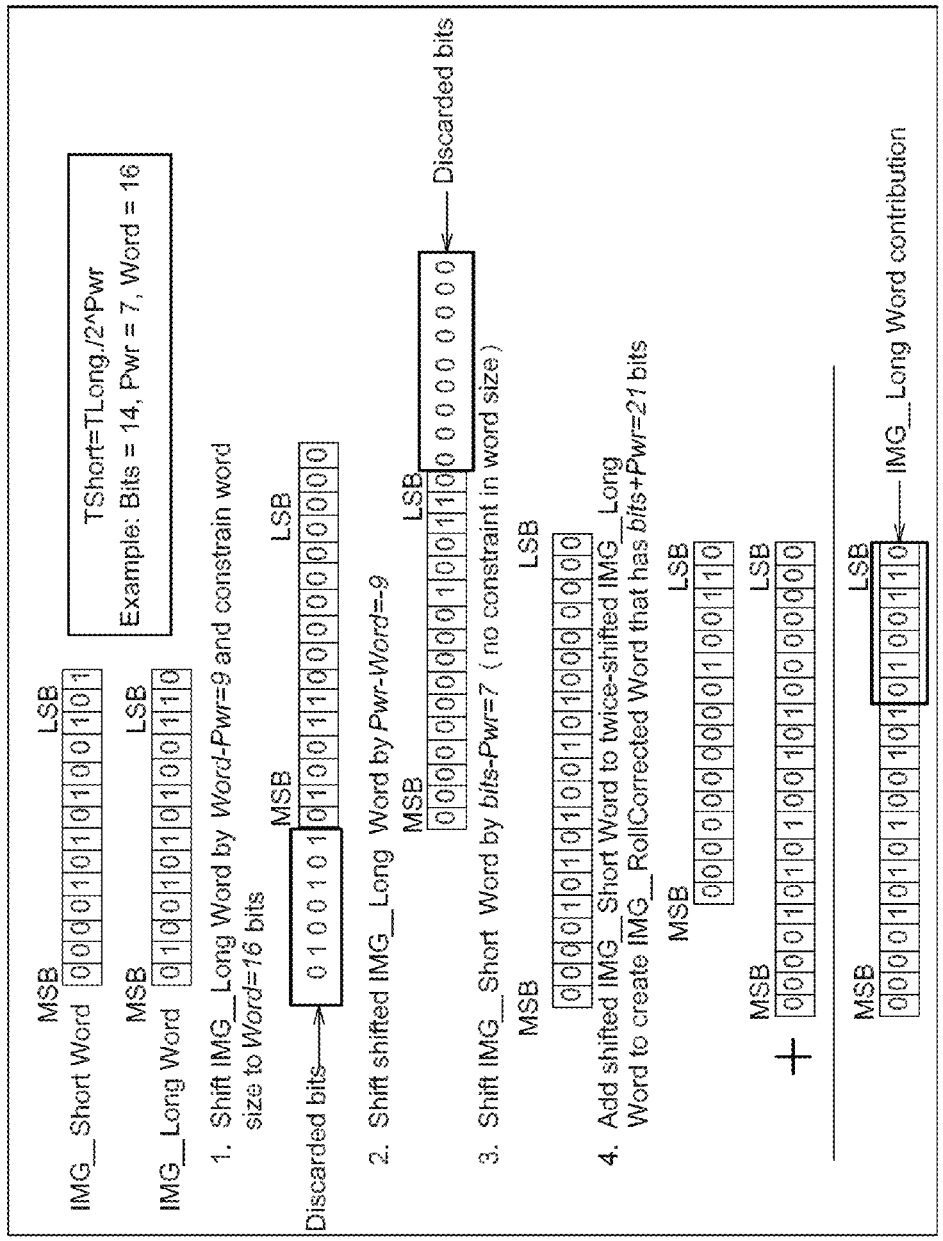
FIG. 5 illustrates another embodiment of THDR imaging using an FPGA or other processor.

FIG. 5 illustrates a THDR implementation in which an FPGA or other processor operably coupled to the counter(s) truncates (discards) the m−n most significant bits (MSBs) from IMG_Long Word to reduce the word size of the residue of the second count. In one example, m=14 and n=7 and IMG_Long Word is reduced from 14 bits to 7 bits. In some implementations, this reduction in word size is accomplished by constraining the bit-shifted word length to a specified size, such as 16 bits. The FPGA then appends the remaining bits from the truncated residue of the second count to the 14 bits of the first count for a given pixel. The bits from IMG_Short Word are appended ahead of the most significant bit of the residue of the second count (i.e., in the more significant positions). The resulting composite count (representing the THDR image) has a word size of m+n=21, where the m=14 most significant bits are from the first count and the n=7 least significant bits are from the residue of the second count.

Figure 6A:
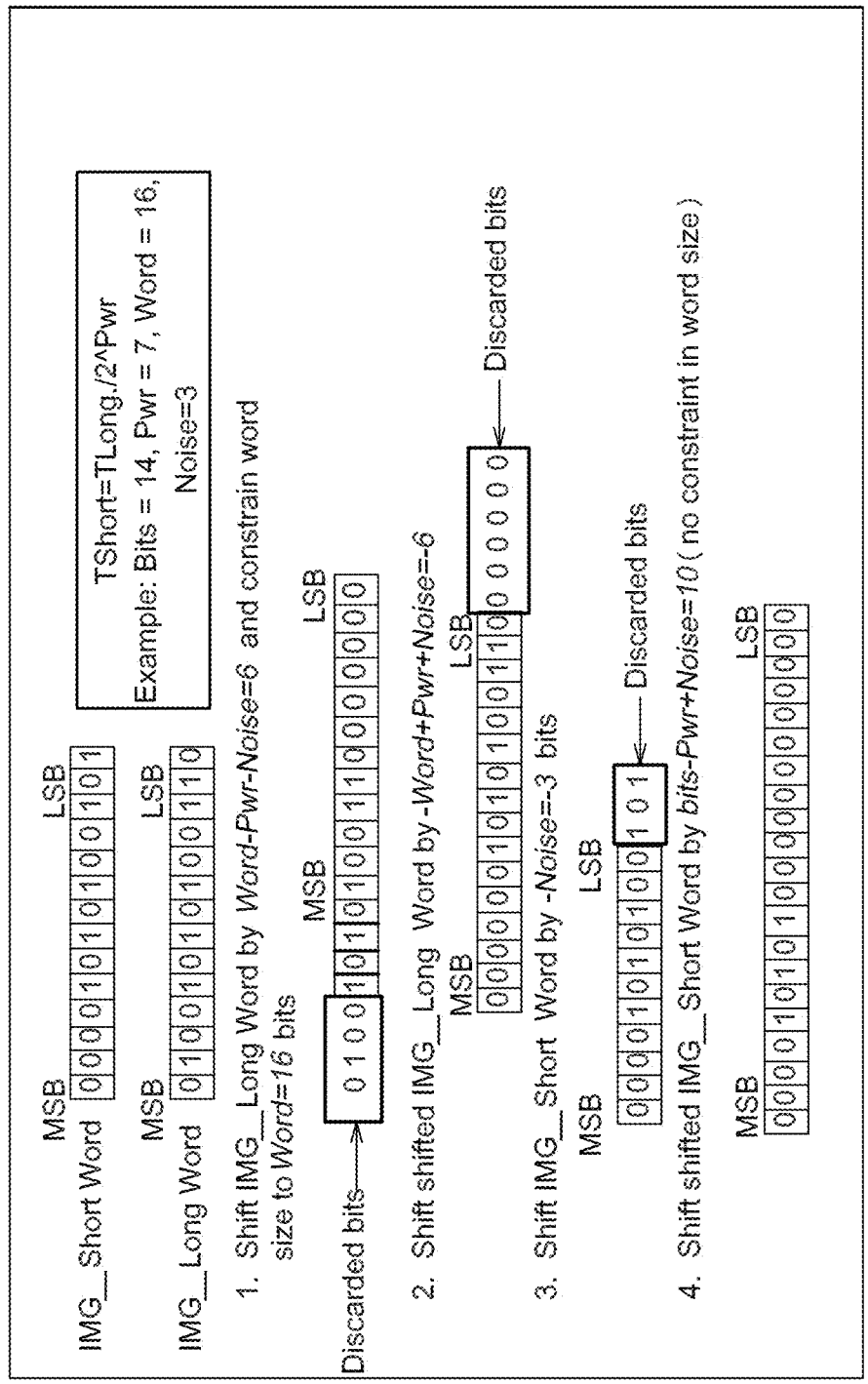
FIGS. 6A and 6B illustrate an embodiment of THDR imaging that includes removing additional bits to compensate for noise.
Figure 6B:
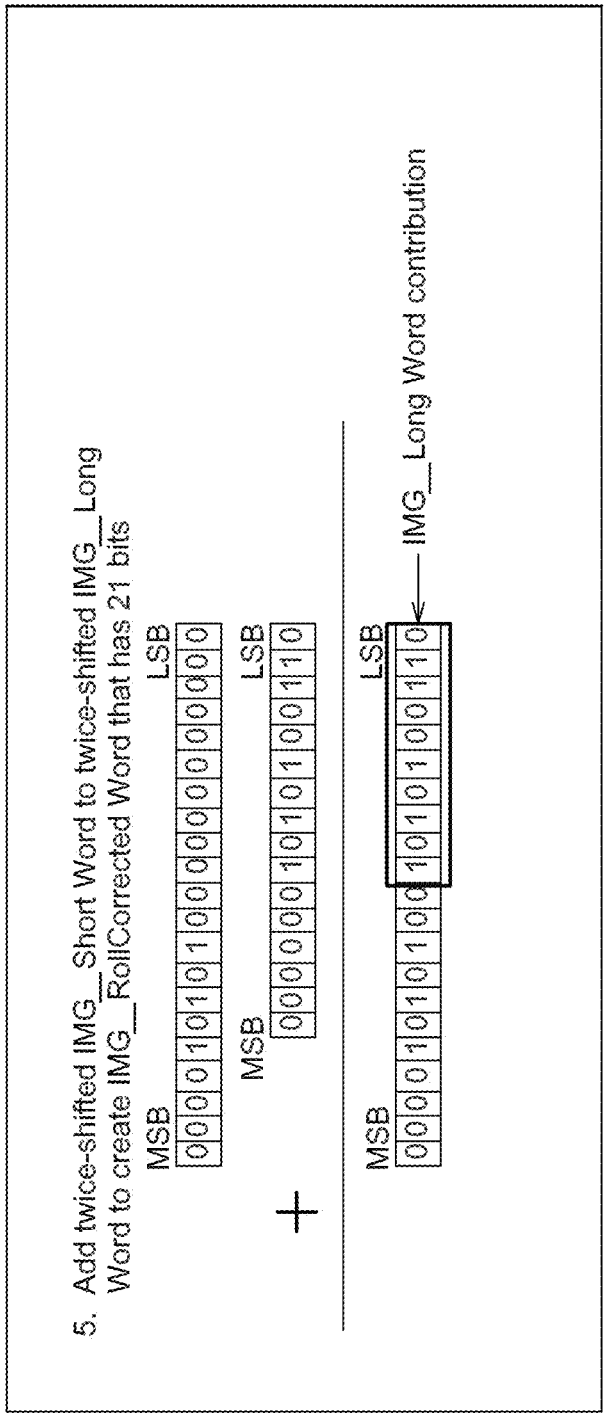

FIGS. 6A and 6B illustrates a THDR implementation in which an FPGA or other processor removes additional bits from the first count, the residue of the second count, or both before combining the first count and the residue of the second count. Removing p bits can reduce noise in the collected data. In one example, m=14, n=7, p=3, and two 14-bit values are collected, the first acquired over an integration time $T_S$ and the second acquired over an integration time $T_L$, with $T_L=T_S \times 2^n$. An FPGA or other processor performs a series of shifts on these values and can constrain the word size of either or both values to w bits. In the example shown in FIGS. 6A and 6B, w=16. The residue of the second count, represented as "IMG_Long Word," is shifted by w−n−p=6 bits, causing the 4 MSBs of IMG_Long Word to be discarded. Next, the shifted IMG_Long word is shifted by −w+n+p=−6 bits, causing the 6 LSBs to be discarded. Next, IMG_Short Word is shifted by −p=−3 bits and the 3 LSBs are discarded. Then, the shifted IMG_Short Word is shifted by m−n+p=10 bits without constraining the word size. Finally, the twice-shifted IMG_Short Word is added to the twice-shifted IMG_Long Word to create a THDR Word that has 21 bits.

Figure 8A:
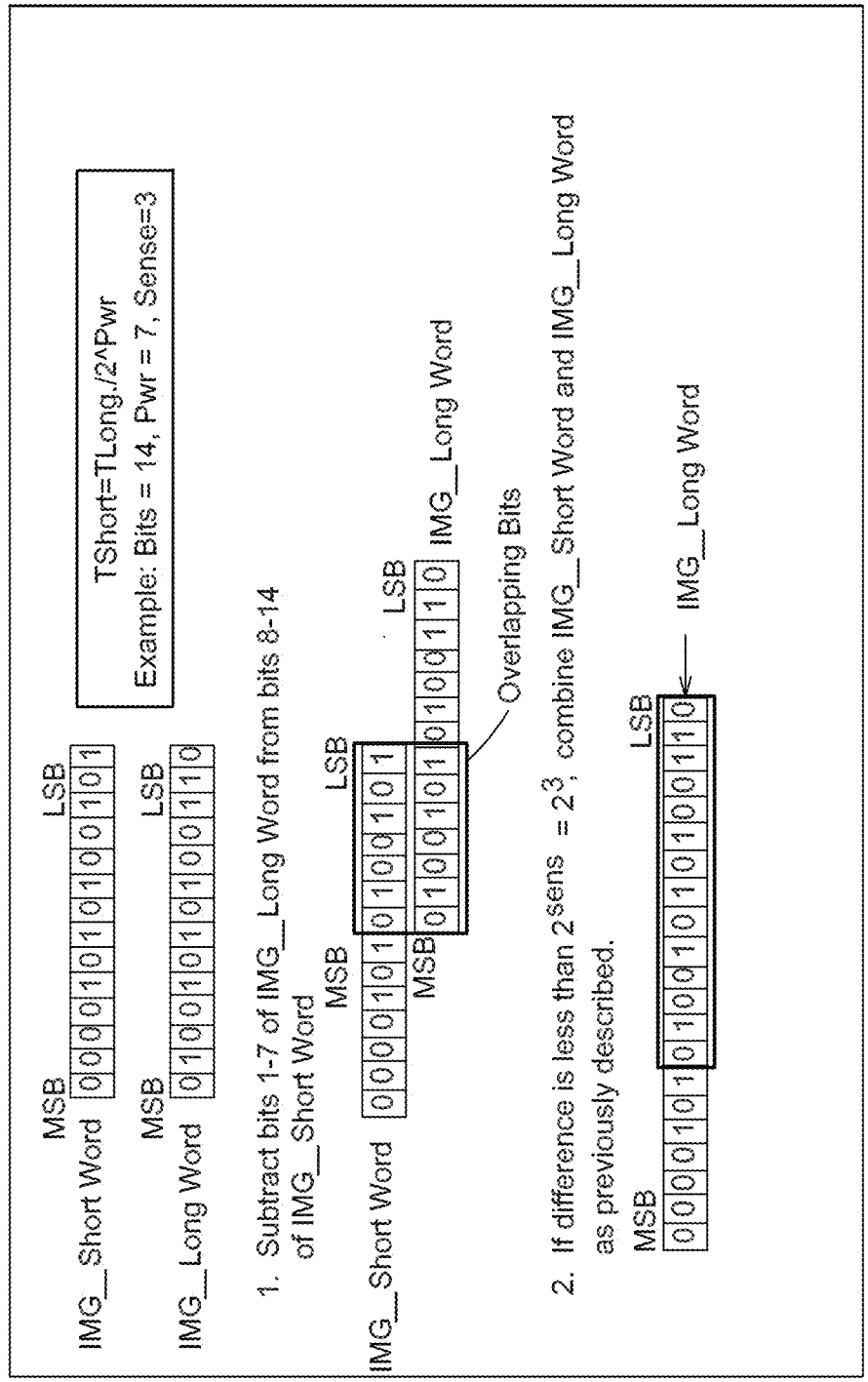
FIGS. 8A and 8B illustrate processes of generating true high dynamic range image by comparing bits acquired during successive long and short integration periods.
Figure 8B:
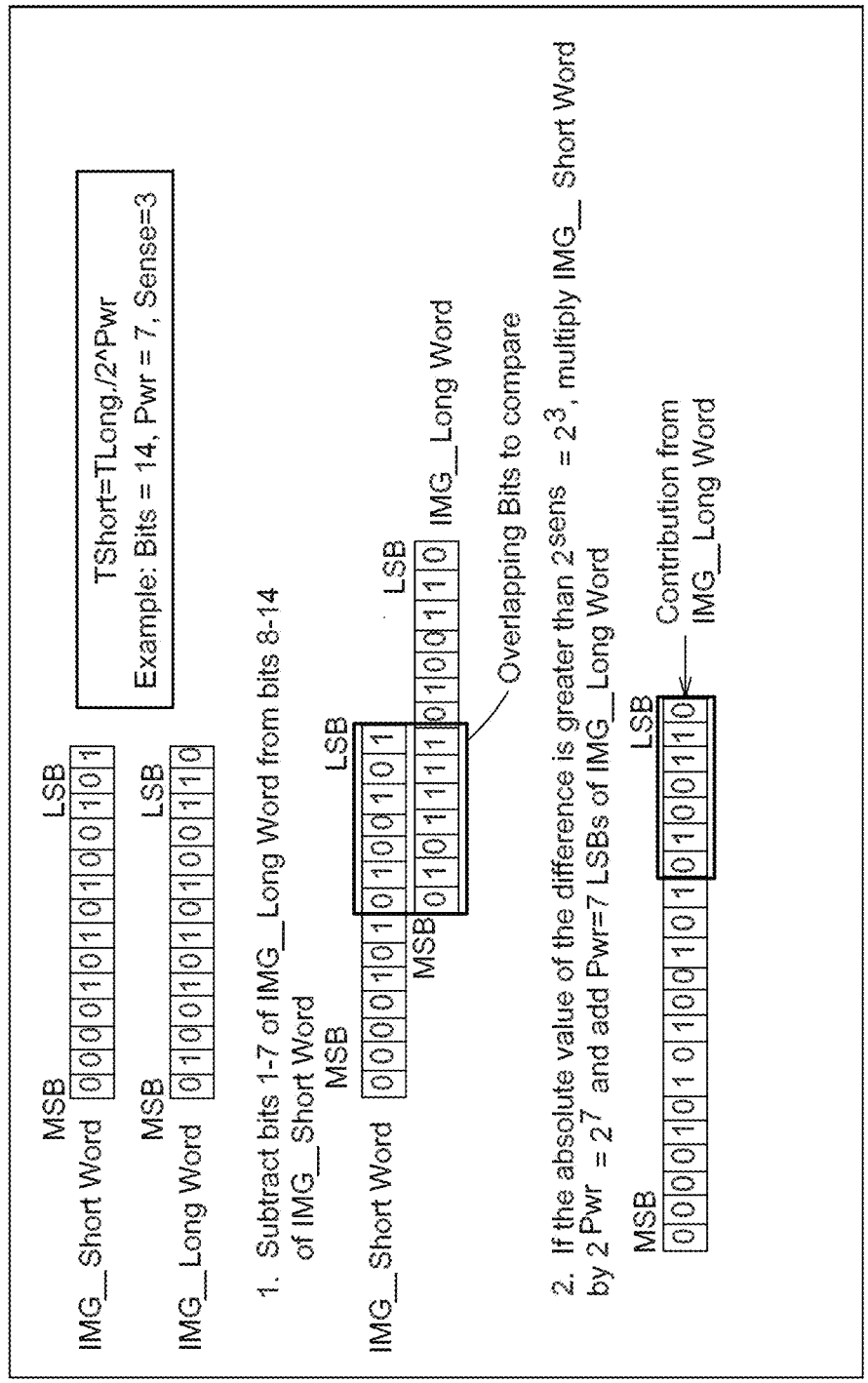

FIGS. 8A and 8B illustrate truncation and append bit-shifting processing that uses redundancy in the first and second measurements made by the counters to detect and mitigate errors. Put differently, in some cases, the first and second integration times are related by a power of two ($T_L=T_S \times 2^n$). Assuming a linear count rate, bits n|1 through m of the first count (e.g., IMG_Short Word) and bits 1 through m−n of the residue of the second count (e.g., IMG_Long Word) should be identical unless either count is corrupted by noise, error from motion, et al. If desired, the overlapping bits can be averaged to improve noise performance or one or more bits from one count could be used to replace the corresponding bits in the other count. For instance, the FPGA or other processor may replace bits in the residue of the second count that are different than overlapping bits of the first count, which are less likely to be affected by electrical noise.

Motion Compensation and Artifact Suppression

Figure 7:
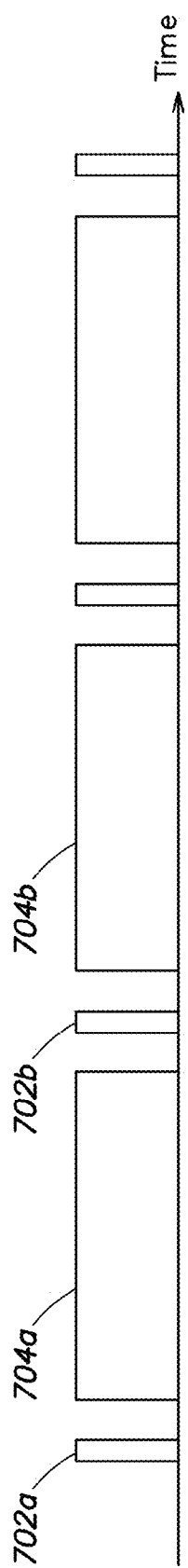
FIG. 7 is a diagram that illustrates image acquisition timing for motion compensation.

Accomplishing THDR for a dynamic scene presents additional challenges. To improve image quality, compensate for motion, and facilitate artifact identification and removal, the DFPA 100 may acquire two snapshot images as shown in FIG. 7—a first snapshot image taken during a first short integration period 702a immediately before a long integration period 704a and a second snapshot taken during a second short integration period 702b taken immediately after the long integration period 704a. (In some cases, the second snapshot may also be used to process data acquired during a second long integration period 704b, and so on.) This pair of snapshot images provides information that can be used to improve the estimated number of rollovers, to identify motion in the scene, and/or to remove artifacts, including motion artifacts, from the THDR image. For instance, the processor may estimate the number of rollovers during the long integration period based on an average of the count rates during the integration periods for the first and second snapshot images. As readily appreciated by those of skill in the art, averaging reduces the uncertainty (noise) associated with estimating the count rate, which in turn improves the accuracy of the estimate of the number of rollovers during the long integration period.

The number of full digital wells, or equivalently, the number of times the counter has reached its maximum count of $2^m$, in the $I_L$ image can be predicted from a comparison of the two snapshot images, $I_{S1}$ and $I_{S2}$. For example, comparing the number of full wells calculated for $I_{S1}$ and $I_{S2}$ can improve the selection of the full well values that are used to produce the THDR image. These values can be selected on a per pixel basis, for example, by choosing the minimum, maximum, mean, or other function of the full well estimates from the $I_{S1}$ and $I_{S2}$ images. Also, comparing the number of full wells estimated from the short collection time(s) to the image acquired during the long integration period can highlight errors and can be used to select other algorithms to compute the THDR image.

Referring again to FIG. 8A, the FPGA or processor may use a "sense" value, denoted sens and equal to 3 for this example, to determine from which image overlapping information is retained. Again, the DFPA acquires two images: a first image $I_S$ acquired over an integration time $T_S$ and a second image $I_L$ acquired over an integration time $T_L$, with $T_L=T_S \times 2^n$, in which n=7. Each of these images includes respective counts from the counters in the DFPA; FIG. 4 shows the first count as "IMG_Short Word"="00001010100101" and the residue of the second count as "IMG_Long Word"="01001010100110." The overlapping bits "0100101" are highlighted in a boxed region. The difference in counts of the overlapping bits is evaluated and compared to the value $2^{sens}=2^3$. The overlapping bits are the same for the first count and the residue of the second count and thus their difference is less than $2^3$ and they are combined. The resulting m+n=21 bit word is "000010101001010100110."

In some scenarios, the overlapping bits will not be identical. FIG. 8B shows a first count of "00001010100101" and a modulus of a second count of "01011010100110." The contribution to the overlapping bits is "0100101" from the first word and "0101111" from the second word. The absolute value of the difference in overlapping bit value is 10 and is greater than the threshold value $2^{sens}=8$. In this case, however, the FPGA multiplies the m bits of the first count by $2^n=2^7$ (which equivalently shifts the m bits by n=7) and adds to this value n least significant bits from the residue of the second count to yield a THDR Word "000010101001010100110" whose word size is m+n=21 bits. That is, truncating the first count leaves the n+s=10 most significant bits. The FPGA also truncates (discards) the s most significant bits from the residue of the second count to yield a truncated second count whose word size is m−s=11. The FPGA appends the truncated first count to the truncated second count to form a composite count whose word size is m+n,=21 with the n+s=10 most significant bits from the first count and the remaining 11 bits from the second count.

The processor may also identify the presence of motion in the scene by comparing the first and second snapshot images. For instance, if subtracting the first snapshot from the second snapshot (or vice versa) yields an image represented by values at or below the noise floor, then the processor may determine that nothing in the scene moved during the first and second integration periods. But if subtracting the first snapshot from the second snapshot (or vice versa) yields an image with motion artifacts (e.g., outlines of objects in the scene), then the processor may determine that at least one object in the scene moved between and/or during the first and second integration periods. In response to this identification of motion, the processor may compensate for the motion, e.g., by shifting values representing one or more pixels in the images before estimating the number of rollovers, discarding certain counts from certain detectors, and/or replaced affected counts collected during the long integration period with appropriately scaled counts acquired during the first or second short integration period.

THDR techniques can be combined with one-point and two-point nonuniformity correction techniques to reduce the noise and improve the uniformity of the THDR image. THDR techniques can be applied to any data collection, such as a scene or a background collection. THDR techniques can also be applied to collecting other types of data, include thermal data (e.g., collected using a bolometer) and audio data (e.g., collected using one or more microphones).

True High Dynamic Range Imagery

Figure 9B:
FIG. 9B is a visible image of the scene shown FIG. 9A.
Figure 9A:
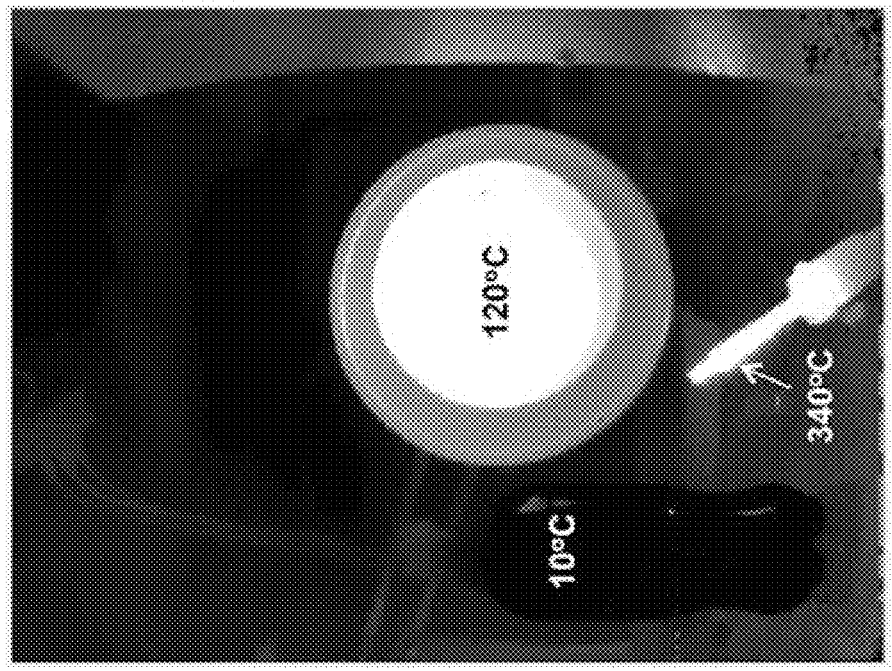
FIG. 9A is an infrared image produced using THDR imaging.

FIGS. 9A and 9B show images in the infrared and visible spectra, respectively, of a scene that includes hot and cold objects. The infrared image was produced using 14-bit counters and true high dynamic range imaging techniques that extended the counter size to an effective 21 bits. The images show a soldering iron whose tip is at a temperature of about 340° C. in front of an incandescent light bulb at a temperature of about 120° C. and a soda bottle at a temperature of about 10° C. All three objects are clearly visible spanning a temperature range of about 330° C. and despite the fact that the incandescent light bulb would saturate a conventional infrared camera at integration periods long enough to detect all of the background features. In fact, FIG. 9B even shows regions of high and low intensity in the bulb itself.

Figure 10A:
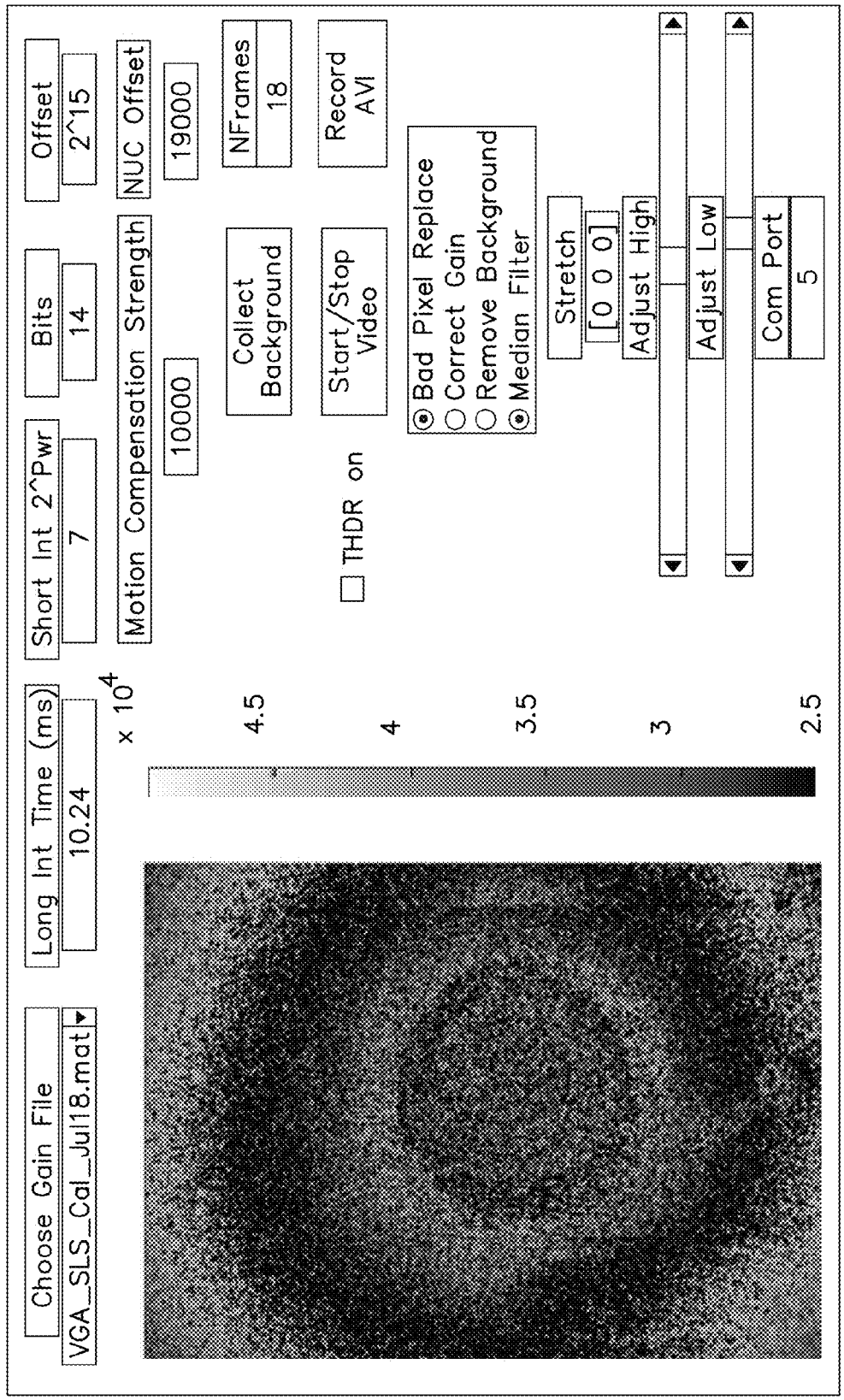
FIGS. 10A to 10D illustrate a user interface for controlling a true high dynamic range imaging system to acquire an infrared image of the scene shown in FIGS. 9A and 9B.
Figure 10B:
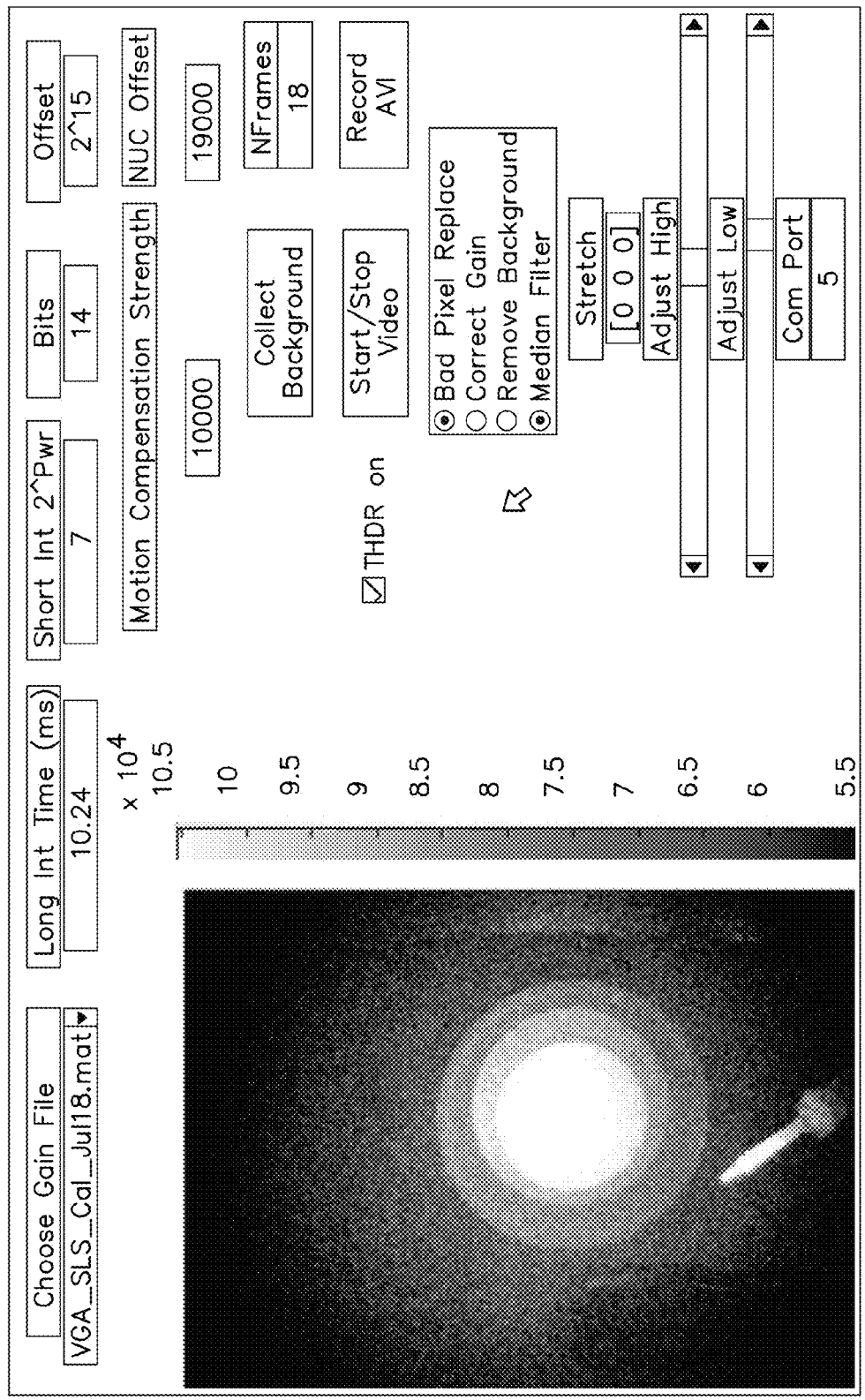
Figure 10C:
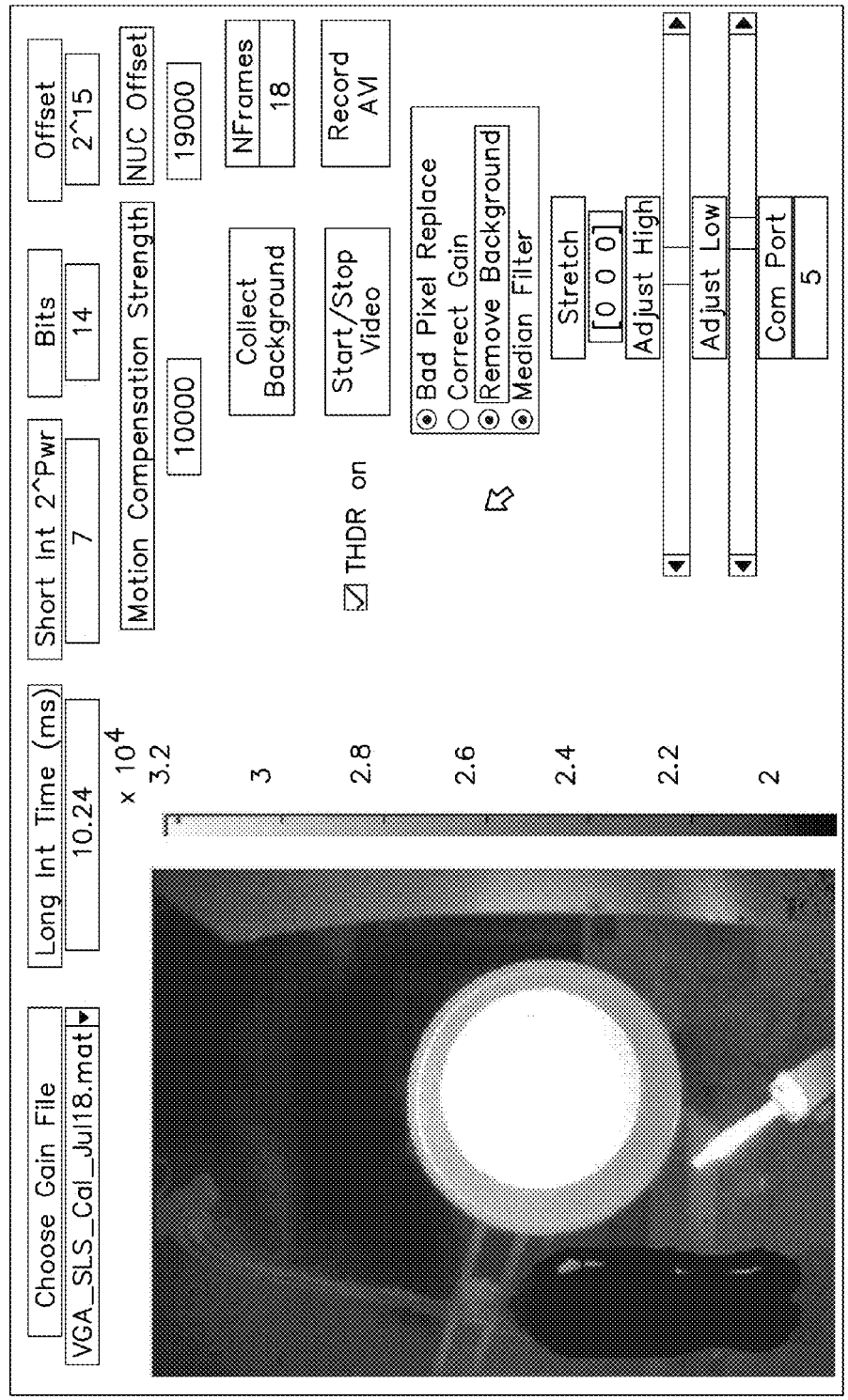
Figure 10D:
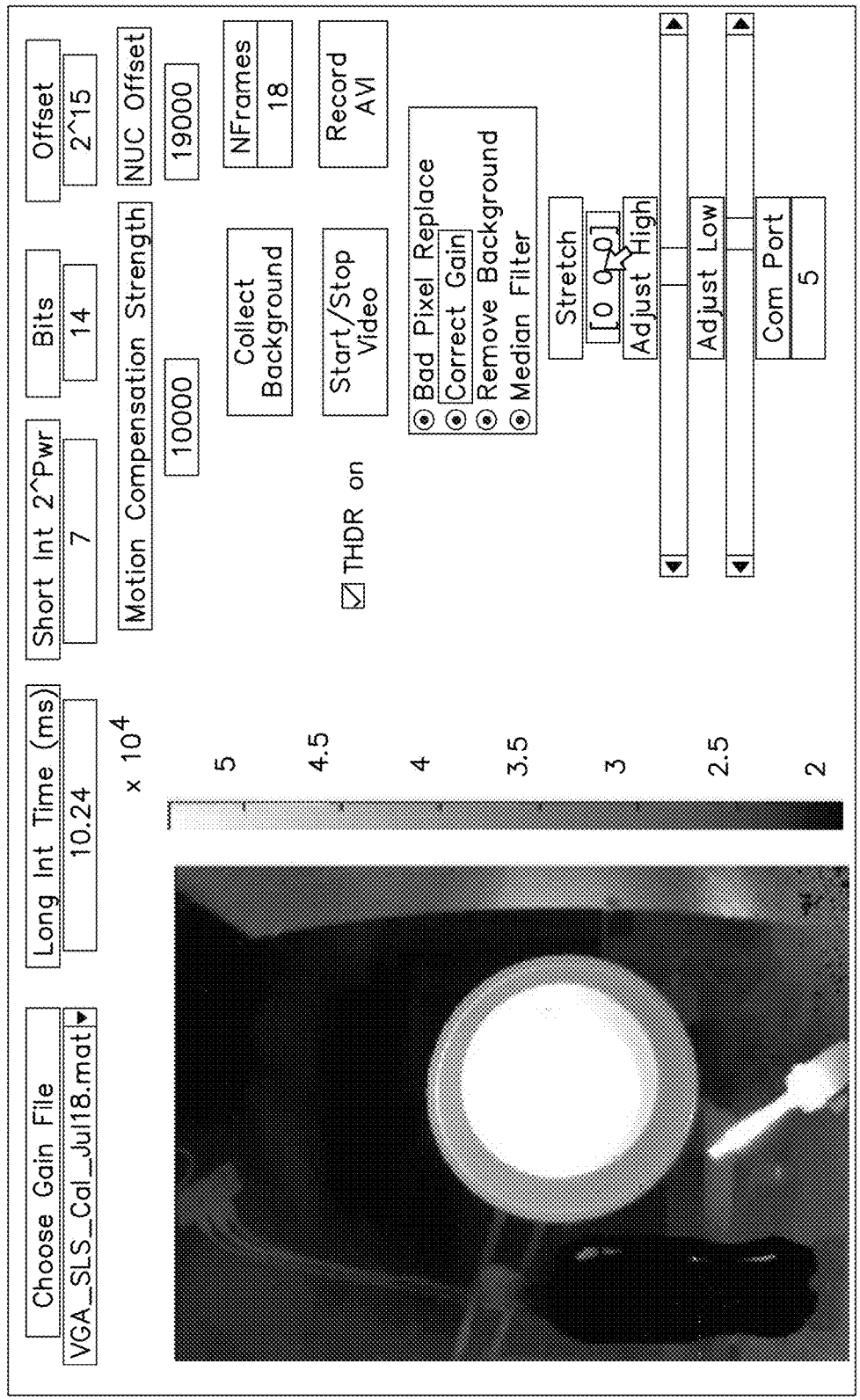

FIGS. 10A-10D show screenshots of a graphical user interface (GUI) for controlling a 640 pixel×480 pixel DFPA that is acquiring infrared images in real-time of the scene depicted in FIGS. 9A and 9B. In FIG. 10A, the GUI is set to produce an image without THDR imaging (labeled in the GUI as Extended Dynamic Range (EDR) imaging), gain correction, or background removal. The image appears grainy and dark, with rings that correspond to the 14-bit counters reaching their maximum counts (16383) and then "rolling over" to begin counting from 0 again. (The darker regions of the image have lower counts than the brighter regions.) In FIG. 10B, the GUI is set with THDR imaging enabled, but without gain correction or background removal; the hot light bulb and soldiering iron tip appear light, but the scene's cooler regions appear indistinct and the image is still grainy. In FIG. 10C, the GUI is set with THDR imaging and background removal (i.e., 1-point nonuniformity correction) enabled, which removes the graininess and makes the cool soda bottle appear more distinct. And in FIG. 10D, the GUI is set with THDR enabled, gain correction and background removal enabled (i.e., 2-point nonuniformity correction) to produce an image in which the hottest and coldest portions of the scene can be distinguished.

Figure 11B:
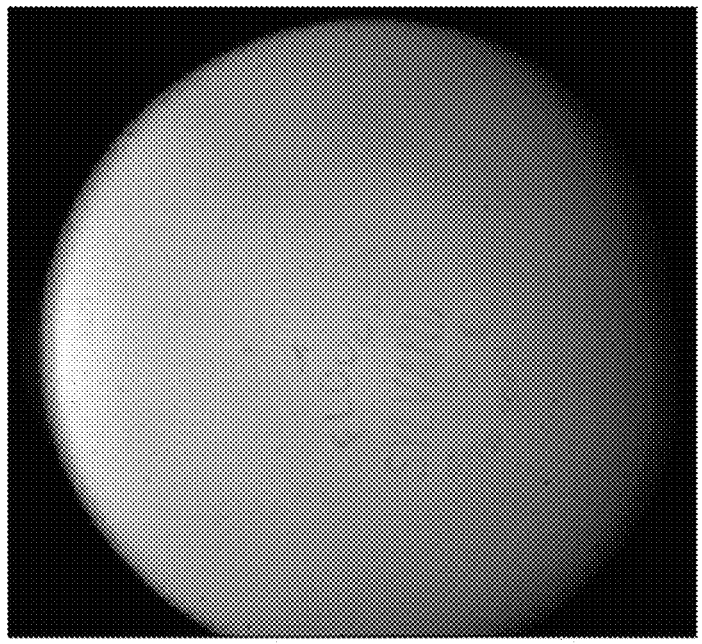
Figure 11A:
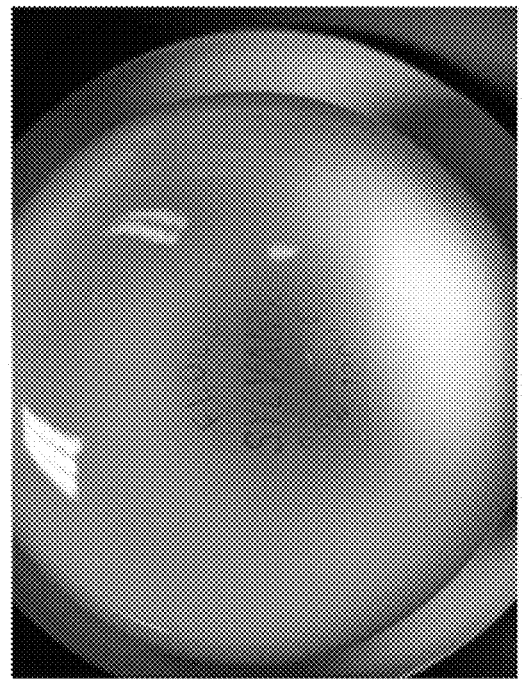
FIG. 11A is a visible image of a lightbulb that is off.

FIGS. 11A and 11B show visible and long-wave infrared images, respectively, of an incandescent light bulb acquired with a strained-layer superlattice detector array and processed using THDR techniques. The light bulb is on in the infrared image. Even though the lightbulb's outer surface is hot and bright, FIG. 11B shows that the THDR technique makes discernable small differences in brightness temperature on the surface of an incandescent light bulb. For instance, the text ("SYLVANA FLOOD 6.5 W 120V") on the light bulb appears in both the visible and long-wave infrared images.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the coupling structures and diffractive optical elements disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of generating a digital representation of a scene with a detector element operably coupled to an m-bit counter, the method comprising:
   generating, in the m-bit counter, a first count representative of detections by the detector element during a first integration period;
   generating, in the m-bit counter, a second count representative of detections by the detector element during a second integration period;
   concatenating k bits of the first count with at least l bits of the second count to form a third count; and forming the digital representation based at least in part on the third count, the digital representation having a dynamic range greater than a dynamic range of the m-bit counter, wherein m, k, and l are positive integers, k≤m, l≤m, and l+k≥m+1.

2. The method of claim 1, wherein generating the second count comprises counting more than $2^m-1$ detections by the detector element during the second integration period.

3. The method of claim 2, wherein concatenating the k bits of the first count with the at least l bits of the second count comprises appending the at least l bits of the second count to the most significant bits of the first count.

4. The method of claim 3, wherein k<m and l=m.

5. The method of claim 3, wherein k=m and l<m.

6. The method of claim 1, further comprising:
setting a gain of the detector element to be greater during the second integration period than during the first integration period.

7. The method of claim 1, further comprising:
selecting the second integration period to be $2^{k+l-m}$ times longer than the first integration period.

8. The method of claim 1, further comprising:
removing p most significant bits of the first count and p least significant bits of the second count prior to concatenating the k bits of the first count with the at least l bits of the second count,
wherein p is a positive integer less than m.

9. The method of claim 1, further comprising:
performing a comparison of m−k least significant bits of the first count to m−k most significant bits of the second count; and
concatenating the k bits of the first count with the at least l bits of the second count based on the comparison.

10. The method of claim 9, wherein performing the comparison comprises determining if a difference between the m−k least significant bits of the first count to the m−k most significant bits of the second count is greater than or equal to a predetermined value.

11. A system for generating a digital representation of a scene, the system comprising:
a detector element to detect incident photons during a first integration period and during a second integration period;
an m-bit counter, operably coupled to the detector element, to generate a first count of representative of photons detected by the detector element during the first integration period and a second count representative of photons detected by the detector element during the second integration period; and
a processor, operably coupled to the m-bit counter, to concatenate k bits of the first count with at least l bits of the second count to form a third count and to generate the digital representation based at least in part on the third count, the digital representation having a dynamic range greater than a dynamic range of the m-bit counter, wherein m, k, and l are positive integers, k≤m, l≤m, and l+k≥m+1.

12. The system of claim 11, wherein the detector element has a gain configured to be greater during the second integration period than during the first integration period.

13. The system of claim 11, wherein the m-bit counter is configured to generate the second count by counting more than $2^m-1$ detections by the detector element during the second integration period.

14. The system of claim 13, wherein the processor is configured to concatenate the k bits of the first count with the at least l bits of the second count by appending the at least l bits of the second count to the most significant bits of the first count.

15. The system of claim 14, wherein k<m and l=m.

16. The system of claim 14, wherein k=m and l<m.

17. The system of claim 11, wherein the second integration period is $2^{k+l-m}$ times longer than the first integration period.

18. The system of claim 11, wherein the processor is configured to remove p most significant bits of the first count and p least significant bits of the second count prior to concatenating the k bits of the first count with the at least l bits of the second count, and
wherein p is a positive integer less than m.

19. The system of claim 11, wherein the processor is configured to perform a comparison of m−k least significant bits of the first count to m−k most significant bits of the second count and to concatenate the k bits of the first count with the at least l bits of the second count based on the comparison.

20. The system of claim 19, wherein the processor is configured to perform the comparison by determining if a difference between the m−k least significant bits of the first count to the m−k most significant bits of the second count is greater than or equal to a predetermined value.

* * * * *